United States Patent [19]
Weinstein et al.

[11] Patent Number: 6,165,305
[45] Date of Patent: Dec. 26, 2000

[54] PRE-CUT FIBROUS INSULATION FOR CUSTOM FITTING WALL CAVITIES OF DIFFERENT WIDTHS

[75] Inventors: Larry J. Weinstein; Robert J. Allwein, both of Littleton; John A. Fry, Conifer; Vern C. Plotts, Littleton; Jo M. Teague, Littleton; William H. Olbert, Littleton, all of Colo.

[73] Assignee: Johns Manville International, Inc., Denver, Colo.

[21] Appl. No.: 09/522,976

[22] Filed: Mar. 10, 2000

Related U.S. Application Data

[62] Division of application No. 09/167,783, Oct. 7, 1998, Pat. No. 6,083,594.

[51] Int. Cl.[7] .............................. B32B 31/08; B32B 31/12
[52] U.S. Cl. ............................ 156/257; 156/268; 428/43; 428/167
[58] Field of Search ............. 428/43, 167; 52/404.1, 52/98, 404.4; 156/268, 257

[56] References Cited

U.S. PATENT DOCUMENTS

| | | | |
|---|---|---|---|
| 2,335,968 | 12/1943 | Sawtell | 20/4 |
| 4,756,945 | 7/1988 | Gibb | 52/404.1 |
| 4,866,905 | 9/1989 | Bihy et al. | 52/743 |
| 5,331,787 | 7/1994 | Paulitschke et al. | 52/746 |
| 5,567,504 | 10/1996 | Schakel et al. | 428/167 |

Primary Examiner—Alexander S. Thomas
Attorney, Agent, or Firm—John D. Lister

[57] ABSTRACT

A fibrous insulation blanket is pre-cut for custom fitting the insulation blanket into structural framework building cavities of different widths. The width of the blanket is substantially equal to the width of a standard cavity to be insulated by the blanket and the blanket has one or more longitudinally extending cuts in a first major surface of the blanket. The cut(s) have a depth greater than one half of the thickness of the blanket and less than the thickness of the blanket whereby the blanket can be handled as a unit for insulating a cavity having a standard cavity width or easily torn apart at a cut by hand for insulating a cavity having less than a standard cavity width. The second major surface of the blanket may have a facing bonded thereto with one or more perforated lines in the facing aligned with the cut(s) to facilitate tearing apart the blanket by hand if required. Preferably, the perforations of the perforated line(s) are closed by the bonding agent bonding the facing to the blanket so that the facing functions as a vapor barrier in spite of the perforations.

4 Claims, 2 Drawing Sheets

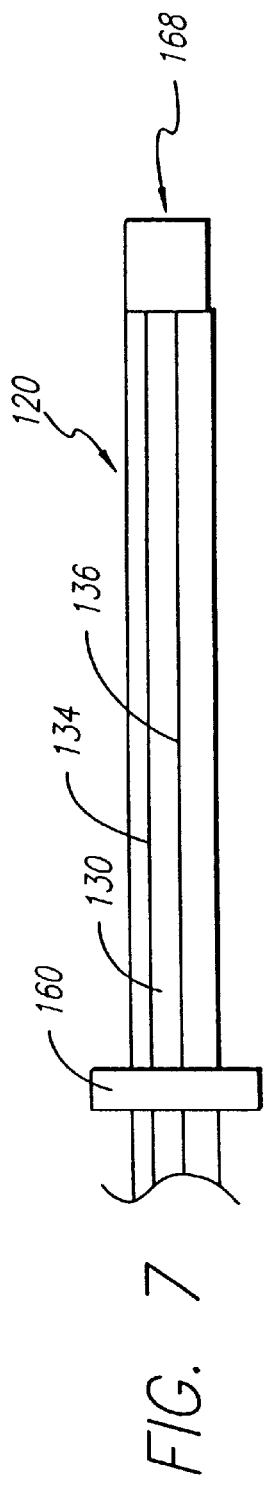
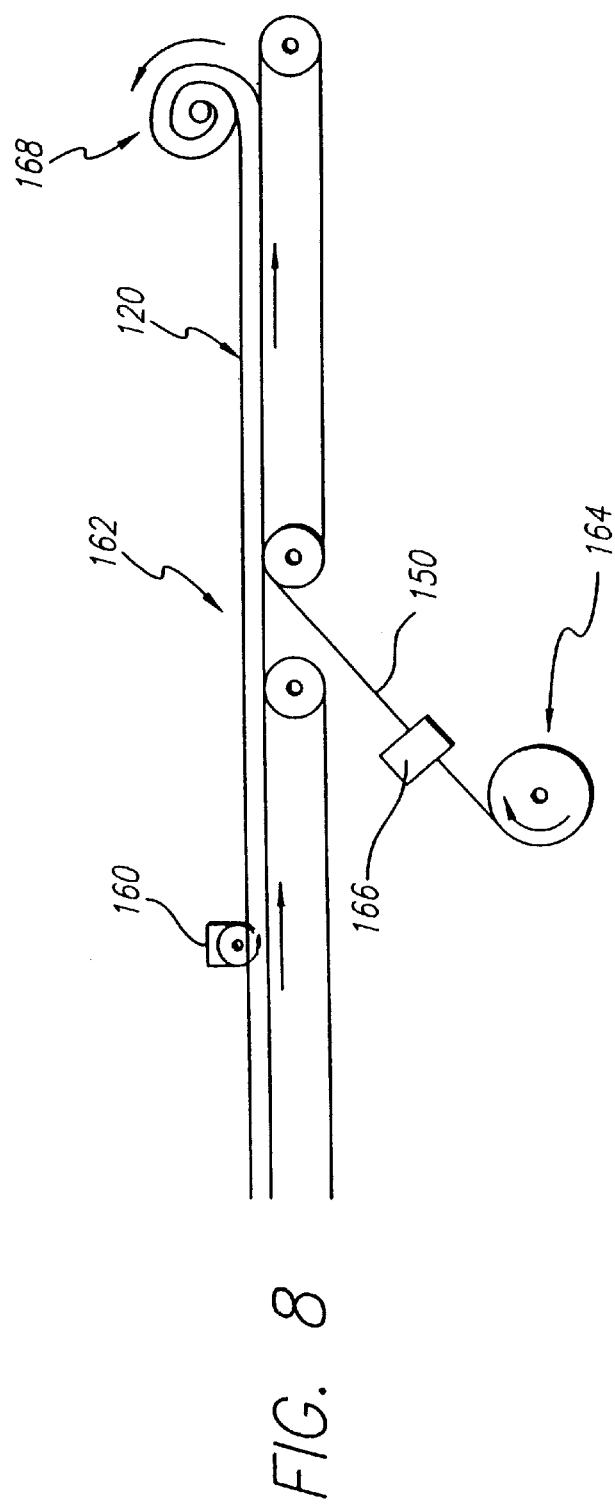

PRE-CUT FIBROUS INSULATION FOR CUSTOM FITTING WALL CAVITIES OF DIFFERENT WIDTHS

This application is a divisional of Ser. No. 09/167,783, filed Oct. 7, 1998, now U.S. Pat. No. 6,083,594.

BACKGROUND OF THE INVENTION

The present invention relates to a fibrous insulation blanket pre-cut for custom fitting the blanket into both standard and non-standard width structural framework building cavities, such as wall cavities; and, in particular, to such a blanket that can be handled as a unit when insulating standard width cavities or easily torn apart (by hand) along the cuts to form narrower blankets when insulating less than standard width cavities.

Building structures, such as residential houses, industrial buildings, office buildings, mobile homes, prefabricated buildings and similar structures typically include walls (both interior and exterior), ceilings, floors and roofs which are insulated for both thermal and acoustical purposes, especially the exterior walls and the roofs of such structures. The walls, ceilings, floors and roofs of these structures include framing members, e.g. studs, rafters, joists, beams and similar support members, which are normally spaced-apart standard distances, and to which sheathing, paneling, lathing or similar construction materials are secured to form the walls, ceilings, floors and roofs. While the contractor seeks to maintain the spacing of such framing members in these structures at these standard distances for ease of construction and insulation of the elongated cavities formed in these walls, ceilings, floors, and roofs, frequently the walls, ceilings, floors and/or roofs of these structures include elongated cavities defined, at least in part, by adjacent framing members which are spaced apart a nonstandard distance less than the standard spacing between framing members. Studies have shown that in a typical residential house, it is common for 50% or more of the framing members in the exterior walls of these structures to be spaced apart at nonstandard distances less than the standard spacing for such framing members.

When insulating these elongated cavities of various nonstandard widths, less than a standard width, it has been the practice to take an insulation batt preformed to fit the standard cavity width and reduce the width of the insulation batt by cutting off and removing a strip of insulation material from one or both longitudinal edges of the insulation batt. U.S. Pat. No. 5,331,787; issued Jul. 26, 1994; to Kaarst; illustrates this approach. In the invention of this patent, the insulation batts or panels have widths at least equal to a predetermined maximum distance between adjacent support members defining the cavities that the batts or panels are to insulate. The batts or panels are provided with facings that are folded over along the longitudinal edges of the batts or panels so that strips of insulation material can be cut away from one or both longitudinal edges of the batts or panels to fit the batts or panels between support members spaced apart less than the predetermined maximum spacing. This method of trimming the insulation batts at the job site by cutting the batts to fit between the more closely spaced support members is time consuming, raises a significant risk or safety issue, relies heavily on the worker's skill to accurately trim the batt or panel.

U.S. Pat. No. 4,866,905; issued Sep. 19, 1989; to Bihy et al; discloses another approach to the problem. In the invention disclosed in this patent, a continuous strip of fibrous insulation with transverse marking lines is provided. The worker cuts the strip of fibrous insulation at the job site to a width somewhat greater than the spacing between the framing members, i.e. rafters, defining the space to be insulated. Of course this method of forming insulation batts or panels at the job site is also time consuming and relies heavily on the skill of the worker cutting the insulation strip to achieve a good result.

A different approach to the problem is shown in U.S. Pat. No. 2,335,968; issued Dec. 7, 1943; to Sawtell. In the invention of this patent, the lateral edges of the insulation blanket are turned down to enable the insulation batt to be placed between framing members, i.e. rafters, spaced closer together than the width of the insulation batt. This approach does not require any cutting or trimming at the job site, but it can be used only where the spacing between the framing members is slightly less than the width of insulation blanket.

Thus it can be seen that there has been a need to provide fibrous insulation blankets or batts which can be used to either insulate standard width framework cavities or be quickly and easily reduced in width to fit less than standard width cavities without a need to cut the fibrous insulation blankets at the job site with knives or similar cutting tools.

SUMMARY OF THE INVENTION

The fibrous insulation blanket of the present invention provides a solution to the above discussed problems. The fibrous insulation blanket of the present invention is pre-cut for custom fitting the insulation blanket into structural framework building cavities of different widths. The width of the blanket is equal to or substantially equal to the width of a standard cavity to be insulated by the blanket, e.g. fifteen inches for a wall cavity, and the blanket has one or more longitudinally extending cuts in a first major surface of the blanket. The cut(s) have a depth greater than one half of the thickness of the blanket and less than the thickness of the blanket whereby the blanket can be handled as a unit for insulating a cavity having a standard cavity width or easily torn apart at a cut by hand for insulating a cavity having less than a standard cavity width.

The second major surface of the blanket may have a facing bonded thereto with one or more perforated lines in the facing aligned with the cut(s) in the blanket to facilitate tearing apart the faced blanket by hand, if required. Preferably, the perforations of the perforated line(s) are closed by the bonding agent (typically, asphalt or other another bituminous material) bonding the facing to the blanket so that the facing functions as a vapor barrier in spite of the perforations. Thus, the fibrous insulation blanket with the facing can still be quickly and easily modified to fit a cavity of a particular width without sacrificing the vapor barrier properties of the facing sheet.

With the pre-cut fibrous insulation blanket of the present invention, the blanket can be quickly and easily sized to fit wall or other building framework cavities without the need to use cutting tools at the job site to cut the insulation. Thus, the use of the pre-cut fibrous insulation blanket of the present invention to insulate the framework cavities of buildings, especially wall cavities, not only reduces safety concerns, but greatly speeds up the installation process. Since insulation installers are frequently paid by the piece, the present invention enables them to operate more profitably.

BRIEF DESCRIPTION OF THE DRAWINGS

FIG. 7 is a schematic plan view of a production line for making the pre-cut fibrous insulation blanket of the present invention.

FIG. 8 is a schematic side elevation of the production line of FIG. 7.

DESCRIPTION OF THE PREFERRED EMBODIMENTS

Figure 1:
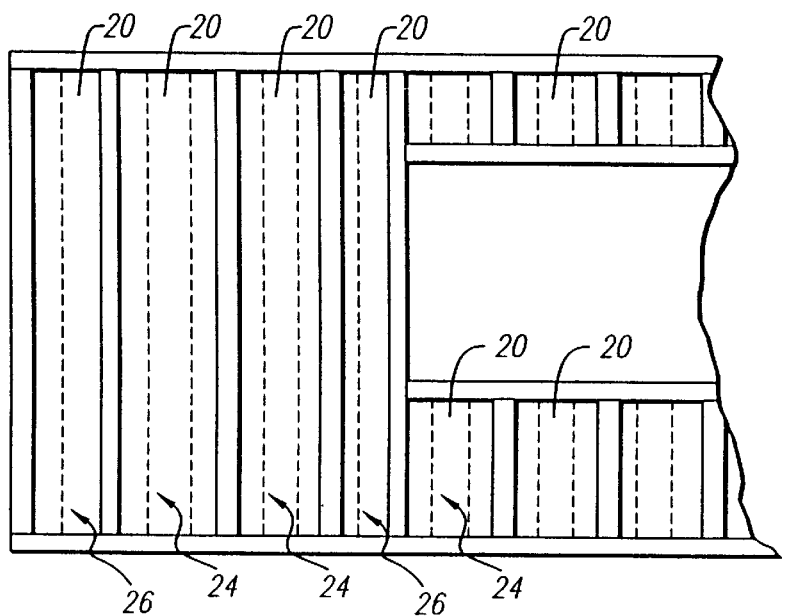
FIG. 1 is a schematic elevation of the frame of an outside wall of a building with the pre-cut fibrous insulation blanket of the present invention installed in standard width and less than standard width structural framework wall cavities.

FIG. 1 shows a portion of a typical outside wall of a residential house with the pre-cut fibrous insulation blanket 20 of the present invention installed in both standard width and non-standard width wall cavities of the outside wall. The widths of the wall cavities are defined by the framing members 22 which are spaced apart a standard distance for standard cavities 24, e.g. fifteen inches for an outside wall cavity, or less than the standard distance for non-standard width cavities 26.

While the pre-cut fibrous insulation blanket 20 may be made of other fibrous materials, preferably the pre-cut fibrous insulation blanket 20 is made of glass fibers. In addition, the pre-cut fibrous insulation blanket 20 is preferably resilient so that, after being compressed to insert the pre-cut fibrous insulation blanket or section(s) of the pre-cut fibrous insulation blanket into a cavity having a width somewhat less than the width of the pre-cut fibrous insulation blanket or the sections of the pre-cut fibrous insulation blanket being inserted into the cavity, the pre-cut fibrous insulation blanket 20 or one or more sections of the pre-cut fibrous insulation blanket 20 inserted into the cavity will expand to the width of a cavity.

Typically, for most applications such as walls in residential houses, the resilient, pre-cut fibrous insulation blankets 20 of the present invention will be delivered to the installer in roll form of various lengths greater than that of a standard fibrous insulation batt or as standard length batts having lengths of about forty-eight or ninety-three inches. The width of the fibrous insulation blanket 20 is substantially equal to or equal to the standard cavity width to be insulated with the fibrous insulation blanket, e.g. about fifteen inches wide for a fibrous insulation blanket used to insulate outside wall cavities of residential houses. The thicknesses of the pre-cut fibrous insulation blankets 20 is determined by the amount of thermal resistance or sound control desired and the depth of the cavities being insulated. Typically, the thickness of the fibrous insulation blanket approximates the depth of the cavities being insulated. For example, in a wall cavity defined in part by nominally 2×4 or 2×6 inch studs or framing members, the pre-cut fibrous insulation blankets will have thicknesses of about three and one-quarter or three and one-half inches and about five and one-half inches respectively.

Figure 2:
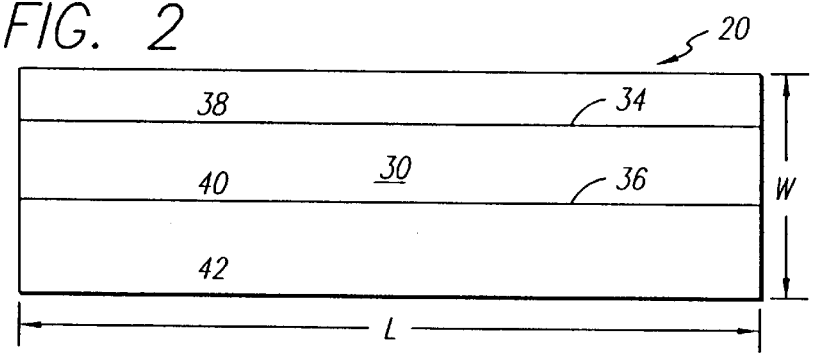
FIG. 2 is a schematic view of a major surface of an unfaced pre-cut fibrous insulation blanket of the present invention.
Figure 3:
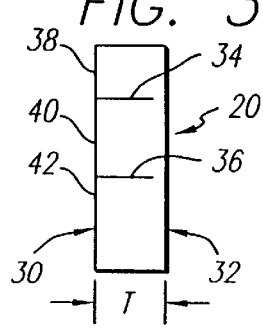
FIG. 3 is a schematic end view of the unfaced pre-cut fibrous insulation blanket of FIG. 2.
Figure 4:
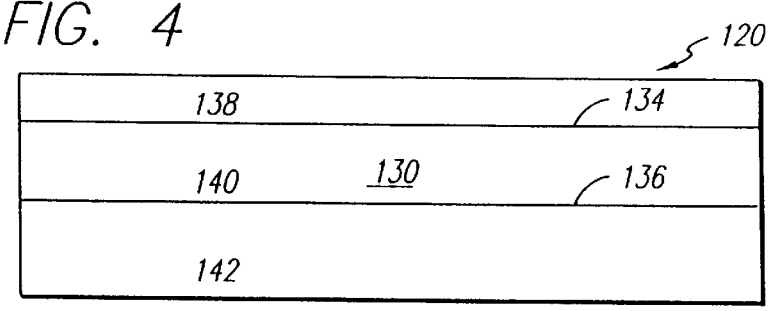
FIG. 4 is a schematic view of a first major surface of a faced pre-cut fibrous insulation blanket of the present invention.

FIGS. 2 and 4 show an unfaced embodiment of the fibrous insulation blanket 20 of the present invention. The fibrous insulation blanket has a length "L", a width "W" and a thickness "T". When used to insulate wall cavities, the length of the fibrous insulation blanket is typically at least three times the width of the fibrous insulation blanket, e.g. fifteen inches wide and about forty eight or ninety three inches in length. The width of the fibrous insulation blanket is equal to or substantially equal to the width of a standard cavity to be insulated.

The pre-cut fibrous insulation blanket 20 has a first major surface 30 and a second major surface 32. There are one or more cuts, preferably two cuts 34 and 36, in the first major surface 30 of the pre-cut fibrous insulation blanket which divide the pre-cut fibrous insulation blanket 20 into two or more sections, preferably three sections 38, 40 and 42, extending the length of the pre-cut fibrous insulation blanket. Preferably, for a pre-cut fibrous insulation blanket having a width of about fifteen inches, the sections 38, 40 and 42 are about three and one-half, five, and six and one-half inches wide.

Each of the cuts 34 and 36 extend for the length of the fibrous insulation blanket and have a depth greater than one half of the thickness of the fibrous insulation blanket but less than the thickness of the fibrous insulation blanket whereby the fibrous insulation blanket can be handled as a unit for insulating a cavity 24 having a standard cavity width or easily torn apart at one or more of the cuts 34 and/or 36 by hand (without the use of a knife or other cutting tool) for insulating a cavity 26 having less than a standard cavity width. Preferably, the cut or cuts 34 and 36 in the first major surface 30 of the pre-cut fibrous insulation blanket 20 extend to within one-quarter of an inch of the second major surface 32, but, as stated above, not to the second major surface.

Figure 5:
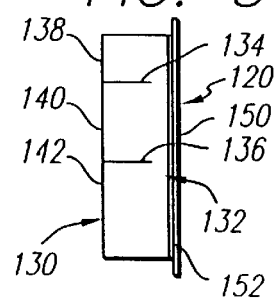
FIG. 5 is a schematic end view of the faced pre-cut fibrous insulation blanket of FIG. 4.
Figure 6:
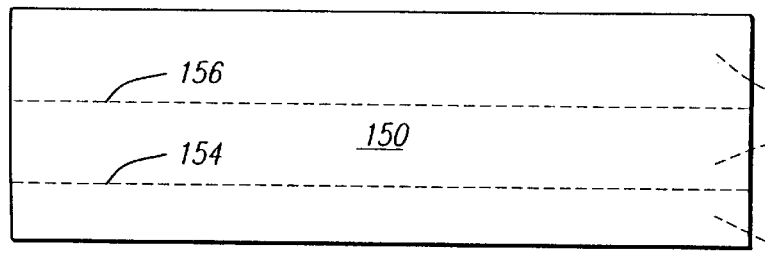
FIG. 6 is a schematic view of a faced, second major surface of the faced, pre-cut fibrous insulation blanket of FIG. 4.

FIGS. 4–6 show a faced embodiment 120 of the pre-cut fibrous insulation blanket. The faced embodiment of the pre-cut fibrous insulation blanket 120 is the same as the unfaced embodiment with the following exceptions: the faced embodiment 120 of the pre-cut fibrous insulation blanket includes a facing 150 and a bonding agent 152 which bonds the facing 150 to the second major surface 132 of the pre-cut fibrous insulation blanket.

As shown, the pre-cut fibrous insulation blanket 120 of FIGS. 4–6 has a first major surface 130 and a second major surface 132. There are one or more cuts, preferably two cuts 134 and 136, in the first major surface 130 of the pre-cut fibrous insulation blanket which divide the pre-cut fibrous insulation blanket 120 into two or more sections, preferably three sections 138, 140 and 142, extending the length of the pre-cut fibrous insulation blanket. Preferably, for a pre-cut fibrous insulation blanket having a width of about fifteen inches, the sections 138, 140 and 142 are about three and one-half, five, and six and one-half inches wide.

Each of the cuts 134 and 136 extend for the length of the fibrous insulation blanket 120 and have a depth greater than one half of the thickness of the fibrous insulation blanket but less than the thickness of the fibrous insulation blanket whereby the fibrous insulation blanket can be handled as a unit for insulating a cavity 24 having a standard cavity width or easily torn apart at one or more of the cuts 134 and/or 136 by hand for insulating a cavity 26 having less than a standard cavity width. Preferably, the cut or cuts 134 and 136 in the first major surface 130 of the pre-cut fibrous insulation blanket 120 extend to within one-quarter of an inch of the second major surface 132, but, as stated above, not to the second major surface.

The facing or facing sheet 150 overlies the entire second major surface 132 of the pre-cut fibrous insulation blanket 120 and is bonded to the second major surface of the pre-cut fibrous insulation blanket. As shown, the facing sheet 150 has first and second perforated lines 154 and 156 therein extending for the length of the pre-cut fibrous insulation blanket. The perforated lines 154 and 156 are longitudinally aligned with the first and second cuts 134 and 136, respectively, in the pre-cut fibrous insulation blanket whereby the pre-cut fibrous insulation blanket 120 with the facing 150 can be handled as a unit for insulating a cavity having a standard cavity width or easily torn apart at either the first or second cut 134 or 136 and the aligned first or second perforated line 154 or 156 by hand (without the use of a knife or other cutting tool) for insulating a cavity having less than a standard cavity width. The spaced apart perforations of the perforated lines 154 and 156 may be of various shapes, including but not limited to, round, oval, elongated, slit shaped, etc.

Preferably, the perforations of the first and second perforated lines 154 and 156 are filled with the bonding agent 152 that bonds the facing sheet 150 to the second major surface 132 of the pre-cut fibrous insulation blanket to close the perforations so that the facing sheet 150 functions as a vapor barrier. Preferably, the bonding agent is an asphalt or other bituminous material that can be applied to one side of the previously perforated facing sheet 150 just prior to applying the facing sheet to the pre-cut fibrous insulation blanket.

The preferred different widths of the sections 38, 40 and 42 or sections 138, 140 and 142, enable the pre-cut fibrous insulation blanket 20 or 120 to be quickly and easily formed into widths of about three and one-half inches (section 38 or 138), five inches (section 40 or 140), six and one-half inches (section 42 or 142), eight and one-half inches (sections 38 and 40 or 138 and 140) and eleven and one-half inches (sections 40 and 42 or 140 and 142). Thus, the pre-cut fibrous insulation blanket 20 or 120 can not only be used to insulate cavities having standard widths, but the width of the pre-cut fibrous insulation blanket can also be quickly and easily modified to fit cavities of various non-standard widths. The use of a resilient fibrous insulation blanket 20 or 120, such as a resilient glass fiber insulation blanket, further enhances the ability of the pre-cut fibrous insulation blanket to conform to various cavity widths.

FIGS. 7 and 8 schematically show a preferred method of making the unfaced or faced pre-cut fibrous insulation blanket 20 or 120. According to the method of the present invention a fibrous insulation blanket of the appropriate width, e.g. fifteen inches wide for wall cavities, is fed through a cutting station 160 where rotary saws or other conventional cutting means form one or more cuts 34 and 36 or 134 and 136 in the first major surface 30 or 130 of the fibrous insulation blanket as the fibrous insulation blanket passes through the cutting station. The cut(s) formed have a depth greater than one half of the thickness of the fibrous insulation blanket but less than the thickness of the fibrous insulation blanket whereby the fibrous insulation blanket can be handled as a unit or easily torn apart at the cut(s) by hand without the use of a knife or other cutting tool. When the fibrous insulation blanket is to be faced, the pre-cut fibrous insulation blanket 120 is then fed into a facing station 162.

A facing or facing sheet 150 with one or more longitudinally extending perforated line(s) 154 and 156 extending for the length of the facing is fed from a supply roll 164. At a bonding agent application station 166 a bonding agent 152, such as but not limited to hot asphalt or another bituminous material, is applied to an upper major surface of the facing sheet 150 for bonding the facing sheet 150 to the second major surface 132 of the pre-cut fibrous insulation blanket 120 and for closing the perforations of the perforated line(s) 154 and 156 so that the facing sheet 150 functions as a vapor barrier in spite of the perforations in the facing sheet. The major surface of the facing sheet with the bonding agent thereon is then brought into contact with the second major surface 132 of the fibrous insulation blanket with the perforated line(s) 154 and 156 longitudinally aligned with the cut(s) 134 and 136 in the pre-cut fibrous insulation blanket 120 and the facing sheet 150 is bonded to the pre-cut fibrous insulation blanket 120 whereby the faced fibrous insulation blanket formed can be handled as a unit for insulating a cavity having a standard cavity width or easily torn apart at a cut and the aligned perforated line by hand (without the use of a knife or other cutting tool) for insulating a cavity having less than a standard cavity width. The pre-cut faced fibrous insulation blanket 120 is then formed into a roll 168, as shown, or cut transversley into selected lengths, e.g. forty eight or ninety three inch lengths to form batts.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a faced, pre-cut fibrous insulation blanket, comprising:

providing a fibrous insulation blanket; the fibrous insulation blanket having a length, a width and a thickness; the length of the fibrous insulation blanket being at least three times the width of the fibrous insulation blanket; the width of the fibrous insulation blanket being substantially equal to the width of a standard cavity to be insulated; the fibrous insulation blanket having a first major surface and a second major surface;

forming a first cut in the first major surface of the fibrous insulation blanket extending for the length of the fibrous insulation blanket; the first cut having a depth greater than one half of the thickness of the fibrous insulation blanket and less than the thickness of the fibrous insulation blanket whereby the fibrous insulation blanket can be handled as a unit for insulating a cavity having a standard cavity width or easily torn apart at the first cut by hand for insulating a cavity having less than a standard cavity width;

feeding the pre-cut fibrous insulation blanket into a facing station;

providing a facing with a longitudinally extending perforated line extending for the length of the facing;

applying a bonding agent to a major surface of the facing for bonding the facing to the second major surface of the fibrous insulation blanket and for closing the perforations of the perforated line so that the facing sheet functions as a vapor barrier; and bringing the facing sheet into contact with the second major surface of the fibrous insulation blanket with the perforated line aligned with the first cut in the fibrous insulation blanket and bonding the facing sheet to the fibrous insulation blanket whereby the faced fibrous insulation blanket formed can be handled as a unit for insulating a cavity having a standard cavity width or easily torn apart at the first cut and the aligned perforated line by hand for insulating a cavity having less than a standard cavity width.

2. The method of making a faced, pre-cut fibrous insulation blanket according to claim 1, wherein: the bonding agent is a bituminous material.

3. The method of making a faced, pre-cut fibrous insulation blanket according to claim 2, wherein: the first cut has a depth extending to within one quarter of an inch of the second major surface of the fibrous insulation blanket.

4. The method of making a faced, pre-cut fibrous insulation blanket according to claim 1, including: forming a second cut in the first major surface of the fibrous insulation blanket which extends parallel to the first cut and is substantially identical to the first cut; and wherein the facing sheet has a second perforated line which is aligned with the second cut when the facing is bonded to the fibrous insulation blanket.

* * * * *